United States Patent [19]

Goldkuhle et al.

[11] Patent Number: 4,964,982

[45] Date of Patent: Oct. 23, 1990

[54] MAIL STACKER

[75] Inventors: Gerhard Goldkuhle; Günter Süssnapp, both of Konstanz, Fed. Rep. of Germany

[73] Assignee: Licentia-Patent-Verwaltungs-GmbH, Frankfurt, Fed. Rep. of Germany

[21] Appl. No.: 354,270

[22] Filed: May 19, 1989

[51] Int. Cl.[5] .............................................. B07C 1/04
[52] U.S. Cl. ................................. 209/539; 209/900; 271/191; 271/202; 414/791
[58] Field of Search ............... 209/539, 584, 900, 934, 209/552; 271/202, 203, 270, 191; 414/791

[56] References Cited

U.S. PATENT DOCUMENTS

| | | | |
|---|---|---|---|
| 3,473,034 | 10/1969 | Goldstern | 209/900 X |
| 3,724,657 | 4/1973 | Katagiri et al. | 209/900 X |
| 4,289,052 | 9/1981 | Woolston et al. | 271/202 X |
| 4,456,127 | 6/1984 | Hams | 209/584 X |
| 4,774,545 | 9/1988 | Tsuji et al. | 271/291 X |

Primary Examiner—Donald T. Hajec
Attorney, Agent, or Firm—Spencer & Frank

[57] ABSTRACT

For a mail stacker including a compartmented path equipped with switches and stack compartments for sorting the letters, to avoid congestion of the letters assigned to the same compartment upon entry into the compartment there is provided a secondary conveying path parallel to part of the primary conveying path, with the length or transporting speed of the secondary conveying path being dimensioned so that, after two of the above-mentioned letters have been separated and combined again, they are now transported in an overlapping arrangement.

3 Claims, 2 Drawing Sheets

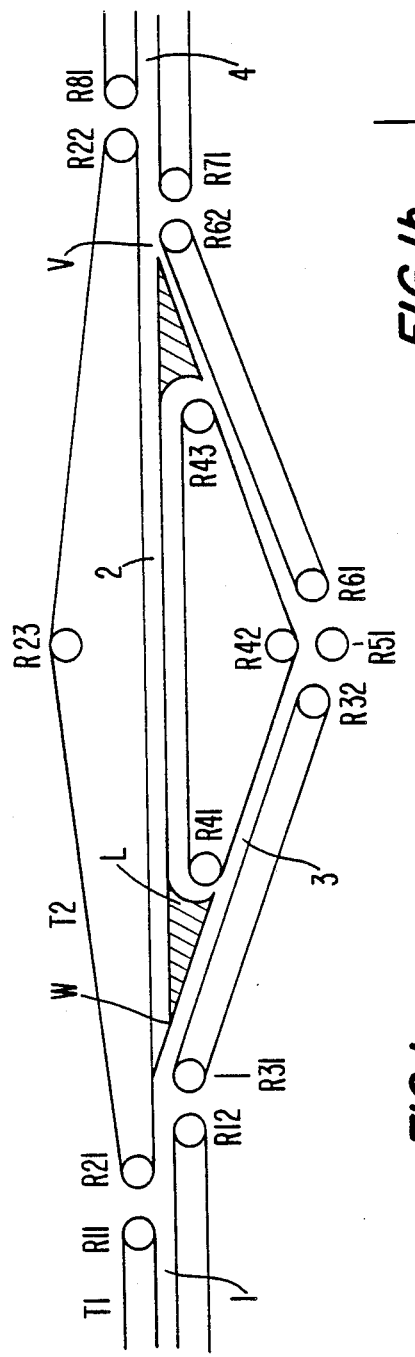
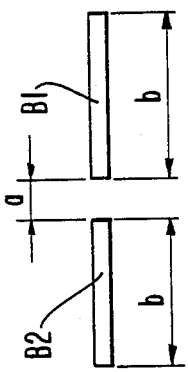
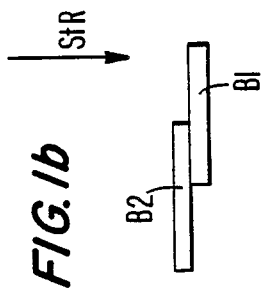
FIG. 1
FIG. 1a
FIG. 1b

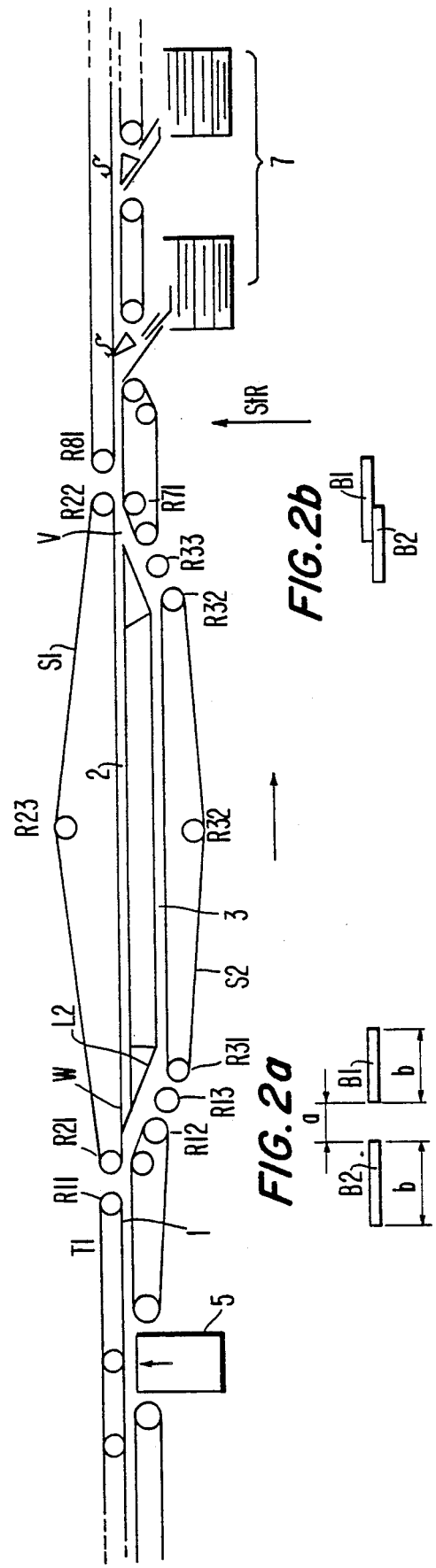

MAIL STACKER

BACKGROUND OF THE INVENTION

The invention relates to a stacker for mail and similar flat, flexible conveying material.

In automatic mail distribution systems, the mail is transported individually on a conveying path for the purpose of automatically reading its destination and later sorting it accordingly. The mail is assigned, by way of a compartmented path equipped with switches, to a plurality of stack compartments according to postal code regions.

In order to obtain the highest possible throughput, the mail moves on the conveyor belt at the greatest possible speed and with the smallest possible spaces between individual articles. Under these circumstances, mail that is assigned to the same stack compartment encounters the problem of congestion caused by the leading edge of the next-following article running onto the trailing edge of the preceding article.

German Offenlegungsschrift DE-OS No. 3,317,865 discloses a mail distribution system for articles of mail that are stacked upright so as to rest on their lower longitudinal edges to guide such articles, when they enter the equipment, so that their lower leading edge enters tangentially into a revolving spindle wheel. In the course of the article entering the stack compartment, the edge of the spindle wheel transports the subsequent portions of the article, particularly its trailing region, in the direction of the already stacked articles so that the next-following article will reliably enter the stack compartment next to the preceding article.

However, a spindle wheel drive for each stack compartment is very complicated and expensive, particularly for fine distribution systems having a large number of small capacity stack compartments and a low throughput.

According to German Offenlegungsschrift DE-OS No. 3,700,827, a pressure roller is provided which is disposed below the contact surface of the incoming articles and which grips the lower edge of the incoming letters with part of its upper roll circumference so as to urge them in the direction of the stack of letters.

SUMMARY OF THE INVENTION

It is an object of the invention to improve the reliability of the stacking of letters to be assigned to the same stack compartment.

The above and other objects are accomplished according to the invention by the provision of a stacker for articles of mail and similar flat, flexible conveying material, including: a conveying path on which the articles are transported individually, the conveying path including a primary conveying path portion having an upstream end and a downstream end, and a secondary conveying path portion diverging from the first conveying path portion at the upstream end and merging with the primary conveying path portion at the downstream end; a compartmented path disposed along the conveying path downstream of the primary and secondary conveying path portions and including switches and stack compartments for sorting articles; a reading device located along the conveying path upstream of the primary and secondary conveying path portions for detecting two successive articles to be assigned to the same stack compartment; a switch at the upstream end of the primary conveying path portion for diverting one of two successive articles assigned to the same stack compartment to the secondary conveying path portion and for allowing the other of the two successive articles to be transported by the primary conveying path portion, the secondary conveying path portion being configured in at least one of length and transporting speed so that when the one article is returned to the conveying path at the downstream end of the primary conveying path portion, the two articles are further transported partially overlapping each other.

The introduction of a secondary conveying path in addition to the primary conveying path now makes it possible to transport successive letters assigned to the same stack compartment, where the danger of congestion and thus crumpling in the stack compartment is particularly great, in an overlapping manner and thus pre-sorted to the common stack compartment.

With the grouping of a larger number of letters assigned to the same stack compartment in pairs, there is simultaneously produced a greater distance between overlapping letter pairs so that stacking reliability is further improved.

BRIEF DESCRIPTION OF THE DRAWINGS

The invention will now be described in greater detail with reference to two embodiments. In detail, it is shown in:

FIG. 1, a schematic of the primary conveying path and the secondary conveying path traveling at the same conveying speeds according to one embodiment of the invention;

FIG. 1a, is a schematic showing two letters B1 and B2 separated by a distance a upstream of switch W in FIG. 1.

FIG. 1b, is a schematic showing two letters B1 and B2 overlapping each other after combining in FIG. 1.

FIG. 2, a schematic of the primary conveying path and the secondary conveying path traveling at different conveying speeds according to another embodiment of the invention.

FIG. 2a is a schematic showing two letters B1 and B2 separated by a distance a upstream of switch W in FIG. 2.

FIG. 2b, is a schematic showing two letters B1 and B2 overlapping each other after combining in FIG. 2.

DETAILED DESCRIPTION OF THE PREFERRED EMBODIMENTS

In both FIGS. 1 and 2, the numeral 1 identifies a conveying path on which the letters arrive already in individualized form. In both embodiments, the letters are transported standing upright on one longitudinal edge. The drawing figures show the conveying paths in a top view. The letters are prevented from falling over by lateral belts moving, for example, around guide rollers R11 and R12. Subfloor belts (not shown) prevent the letters from falling out of the lateral belts. Referring momentarily to FIG. 2, on the left outside of the figure, there is disposed a reading device 5 for determining the destination of the letter, and on the right there is shown the compartment path 7 including switches and stack compartments for sorting the letters according to their respectively determined destinations. These devices which are only shown in FIG. 2 and not shown in FIG. 1 for simplicity of illustration, are disclosed, for example, in German Offenlegungsschrift DE-OS No. 3,317,865.

According to the invention, an additional conveying path marked secondary conveying path 3 is provided in parallel with part of the conveying path, here called primary conveying path 2.

Referring to FIGS. 1, 1a and 1b the transporting speed in this embodiment is the same on both conveying paths, but secondary conveying path 3 is longer than the primary conveying path.

Primary conveying path 2 includes guide rollers R21 to R23, and a metal guide sheet $L_r$. Secondary conveying path 3 includes outer lateral belts which move around guide rollers R31, R32 and R61, R62 and an intermediate roller R51 as well as the inner lateral belt moving around guide rollers R41, R42 and R43. A switch W guides the first letter B1 of two letters assigned to the same stack compartment into secondary conveying path 3. At combining location V, this letter, together with the second letter B2, enters the continuing transporting path 4 including guide rollers R71 and R81.

The detour u over secondary conveying path 3 is selected in such a manner that, if a is the distance between letters (see FIG. 1a) and b is the length of the shortest letter to be expected, $$a < u < b.$$

It must always be ensured that, after the two letters join up, the second letter B2 is transported further on continuing conveying path 4 in an overlapping arrangement (see FIG. 1b).

The stacking device in which the letters are stacked together with the already stacked letters is indicated as StR in FIG. 1. Due to the overlapping of the letters, the second letter can no longer abut on the first letter during the stacking process and the distance a between such pairs of letters or a pair of letters and an unpaired letter becomes greater which additionally increases stacking reliability.

FIGS. 2, 2a and 2b show a further embodiment according to the invention which, is particularly advantageous from a space saving point of view. Parts performing the same functions are given the same reference numerals so that they need not be described again.

The transporting direction of the letters in FIG. 2 is again from the left to the right, but the transporting speed of the letters in secondary conveying path 3 is greater than in primary conveying path 2. This is realized by a faster moving transporting belt between guide rollers R31 and R32.

Here again, subfloor belts (not shown), whose speed is adapted to the respective conveying paths, prevent the letters from slipping out toward the bottom. A metal guide sheet L supports the letters on one side.

A second letter B2 conducted into secondary conveying path 3 by switch W, because of its greater speed, catches up with the first letter B1 transported in primary conveying path 2 so that, from combining location V on, letter B2 is transported in a manner in which it overlaps letter 1 [sic] (see FIG. 2b).

If the conveying speed of primary conveying path 2 is v1 and the length of the faster conveying path between guide rollers R31 and R32 is d, the following applies:

$$\left(1 + \frac{c}{d}\right) \cdot v1 < v2 < \left(1 + \frac{a+b}{d}\right) \cdot v1$$

The switch is set by way of a control device controlled by a reading device under consideration of the transporting speed of the letters.

We claim:

1. A stacker for articles of mail and similar flat, flexible conveying material, comprising:
   a conveying path on which the articles are transported individually, said conveying path including a primary conveying path portion having an upstream end and a downstream end, and a secondary conveying path portion diverging from said first conveying path portion at said upstream end and merging with said primary conveying path portion at said downstream end;
   a compartmented path disposed along said conveying path downstream of said primary and secondary conveying path portions and including switches and stack compartments for sorting articles;
   a reading device located along said conveying path upstream of said primary and secondary conveying path portions for detecting two successive articles to be assigned to the same stack compartment;
   a switch located at the upstream end of said primary conveying path portion for diverting one of two successive articles assigned to the same stack compartment to said secondary conveying path portion and for allowing the other of the two successive articles to be transported by the primary conveying path portion, said secondary conveying path portion being configured in at least one of length and transporting speed so that when the one article is returned to the conveying path at the downstream end of the primary conveying path portion, the two articles are further transported partially overlapping each other.

2. A stacker according to claim 1, wherein the primary and secondary conveying path portions have the same transporting speed, the secondary conveying path portion has a length that is greater than the length of the primary conveying path portion, and said switch at the upstream end of said primary conveying path portion diverts the first article of the two successive articles to said secondary conveying path portion.

3. A stacker according to claim 1, wherein the primary and secondary conveying path portions have approximately the same length, the secondary conveying path portion has a transporting speed that is greater than the transporting speed of the primary conveying path portion, and said switch at the upstream end of said primary conveying path portion diverts the second of the two successive articles to the secondary conveying path portion.

* * * * *